United States Patent

Henderson et al.

(10) Patent No.: US 9,101,998 B2
(45) Date of Patent: Aug. 11, 2015

(54) AIR-CARBON ARC SYSTEM AND APPARATUS FOR DETECTING AND/OR REDUCING IRREGULARITIES IN A WORK PIECE SURFACE AND METHOD OF USING THE SAME

(75) Inventors: Jeffrey Steven Henderson, Corinth, TX (US); Patrick Allen Laymon, Denton, TX (US); Glenn K. Redding, Flower Mound, TX (US); Jacques Wang, Ningbo (CN); Alex Wang, Ningbo (CN)

(73) Assignee: Victor Equipment Company, Chesterfield, MO (US)

( * ) Notice: Subject to any disclaimer, the term of this patent is extended or adjusted under 35 U.S.C. 154(b) by 414 days.

(21) Appl. No.: 13/587,651

(22) Filed: Aug. 16, 2012

(65) Prior Publication Data

US 2013/0043220 A1 Feb. 21, 2013

Related U.S. Application Data

(60) Provisional application No. 61/525,024, filed on Aug. 18, 2011.

(51) Int. Cl.
*B23K 9/013* (2006.01)
*B23K 9/10* (2006.01)
*B23K 9/32* (2006.01)

(52) U.S. Cl.
CPC ............... *B23K 9/013* (2013.01); *B23K 9/1087* (2013.01); *B23K 9/32* (2013.01)

(58) Field of Classification Search
CPC ......... B23K 9/013; B23K 9/1087; B23K 9/32
See application file for complete search history.

(56) References Cited

U.S. PATENT DOCUMENTS

| 3,659,071 | A | | 4/1972 | Henderson |
| 4,258,425 | A | * | 3/1981 | Ramsey et al. .......... 219/124.34 |
| 4,491,718 | A | * | 1/1985 | Cook et al. ............... 219/124.22 |
| 4,492,841 | A | * | 1/1985 | Delius ......................... 219/69.1 |
| 4,540,870 | A | * | 9/1985 | Kaufmann ............... 219/124.22 |
| 4,959,523 | A | * | 9/1990 | Fihey et al. .............. 219/124.34 |
| 6,249,718 | B1 | * | 6/2001 | Gilliland et al. ............. 700/255 |
| 8,946,582 | B1 | * | 2/2015 | Bong ......................... 219/73.21 |
| 2003/0062352 | A1 | * | 4/2003 | Kislovsky et al. ....... 219/130.21 |
| 2003/0132725 | A1 | * | 7/2003 | Cheung .......................... 318/280 |
| 2004/0007562 | A1 | * | 1/2004 | Kitahori et al. ............ 219/86.41 |
| 2004/0027089 | A1 | * | 2/2004 | Forsey .......................... 318/685 |
| 2006/0226137 | A1 | * | 10/2006 | Huismann et al. ....... 219/137.71 |

(Continued)

FOREIGN PATENT DOCUMENTS

JP 1312908 12/1989
JP 4-33786 A * 2/1992

(Continued)

OTHER PUBLICATIONS

PCT/US2012/051149 International Search Report and Written Opinion (Nov. 19, 2012).

*Primary Examiner* — Geoffrey S Evans
(74) *Attorney, Agent, or Firm* — Kacvinsky Daisak Bluni PLLC (57) ABSTRACT

An air-carbon arc system for reducing irregularities in a work piece surface including a control box, a torch head operationally connected to the control box and configured to cooperate with the work piece to generate an arc, and a pendant operationally connected to the control box and having a means for reducing irregularities in the work piece surface.

13 Claims, 8 Drawing Sheets (56) References Cited

U.S. PATENT DOCUMENTS

2008/0037538 A1* 2/2008 Calligaro et al. ............. 370/389
2010/0164739 A1* 7/2010 Heberer ........................ 340/679

FOREIGN PATENT DOCUMENTS

| JP | 9-271975 A | * 10/1997 |
| JP | 2000061690 | 2/2000 |
| JP | 2000218364 | 8/2000 |

* cited by examiner

AIR-CARBON ARC SYSTEM AND APPARATUS FOR DETECTING AND/OR REDUCING IRREGULARITIES IN A WORK PIECE SURFACE AND METHOD OF USING THE SAME

CROSS-REFERENCE TO RELATED APPLICATIONS

This application claims the benefit of provisional application Ser. No. 61/525,024, filed on Aug. 18, 2011. The disclosure of the above application is incorporated herein by reference.

FIELD

The present disclosure relates generally to an air-carbon arc system, apparatus, and method of using the same. More specifically, the disclosure relates to an air-carbon arc system and apparatus for detecting and/or reducing irregularities in a work piece surface and a method of using the same.

BACKGROUND

The statements in this section merely provide background information related to the present disclosure and may not constitute prior art.

Air-carbon arc systems and processes may be used in a wide variety of applications, such as metal fabrication and casting finishing, chemical and petroleum technology, construction, mining, general repair, and maintenance. With respect to metal fabrication and casting finishing, air-carbon arc metal removing systems and processes may be used to gouge, groove, cut, or flush metal from a surface. Nearly all metals may be fabricated, including, but not limited to: carbon steel, stainless steel and other ferrous alloys; gray, malleable and ductile iron; aluminum; nickel and copper alloys and other nonferrous metals.

It may be desirable to use air-carbon arc metal removing systems or processes to modify a working piece such as to have a generally flat, flush, smooth, and/or otherwise constant surface. However, if the work piece surface includes irregularities, then it may be difficult to create a generally flat, flush, smooth, and/or otherwise constant surface through the use of air-carbon arc systems processes.

It may be desirable to remove and/or reapply hardfaced material from an object. "Hardfacing" is a technique which involves applying a layer of hard material to a substrate for the purpose of increasing the wear and corrosion resistance of the substrate. The layer of hard material may be applied to the object by welding or thermal spraying. Hardfacing by arc welding may be used as a surfacing operation to extend the service life of industrial components, pre-emptively on new components, or as part of a maintenance program. Hardfacing may result in significant savings in machine down time and production costs; as a result this process has been adopted across many industries such as steel, cement, mining, petrochemical, power, sugar cane and food.

Steel mill rolls or shafts are often hardfaced. For example, rolls and shafts are commonly modified to have a series of concentric hardfaced circles adjacent to each other and evenly-spaced along all or a portion of the length of the roll or shaft. As another example, rolls or shafts may be modified to have a series of square-shaped hardfaced surfaces adjacent to each other and evenly-spaced along all or a portion of the length of the roll or shaft. Hardfaced steel mill rolls may be used in a variety of applications, such as a crushing roller for a paper mill.

Despite the advantages of hardfacing, hardfaced material may be subject to wear before the non-hardfaced material of a component. This may be due to many factors such as the brittleness or other properties of the hardfaced material or the fact that hardfaced portions of a component are often the working surfaces of the component and are therefore subject to disproportionate stresses and forces while the component is in operation. As a result of these and other factors and varying operating conditions, hardfaced materials may not wear evenly and may include irregular surfaces.

It is therefore desirous to provide an air-carbon arc system and apparatus for detecting and/or reducing irregularities in a work piece surface and a method of using the same.

SUMMARY

In overcoming the limitations and drawbacks of the prior art, the present system, apparatus, and method provide an air-carbon arc system and apparatus for detecting and/or reducing irregularities in a work piece surface and a method of using the same.

In one aspect an air-carbon arc system is provided for detecting and/or reducing irregularities in a work piece surface, the system including, a control box, a torch head operationally connected to the control box and configured to cooperate with the work piece to generate an arc, and a pendant operationally connected to the control box and having a means for reducing irregularities in the work piece surface. The system may be able to detect and/or reduce irregularities either manually or automatically.

In another aspect an air-carbon arc apparatus is provided for detecting and/or reducing irregularities in a work piece surface, the apparatus including, a control box, a torch head operationally connected to the control box and configured to cooperate with the work piece to generate an arc, and a pendant operationally connected to the control box and having a means for reducing irregularities in the work piece surface. The system may be able to detect and/or reduce irregularities either manually or automatically In yet another aspect, a method is provided for reducing irregularities in a work piece surface including: operating an air-carbon arc system to remove material from the work piece surface, wherein the air-carbon arc system includes a control box, a torch head having an electrode and operationally connected to the control box and configured to cooperate with the work piece to generate an arc, and a pendant operationally connected to the control box; measuring a voltage across the work piece; controlling the position of the electrode with respect to the work piece surface so as to maintain as substantially constant the voltage across the work piece; and discontinuing the step of controlling the position of the electrode when a irregularity in the work piece surface is detected.

Further objects, features and advantages of the system, apparatus, and method will become readily apparent to persons skilled in the art after a review of the following description, with reference to the drawings and claims that are appended to and form a part of this specification.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
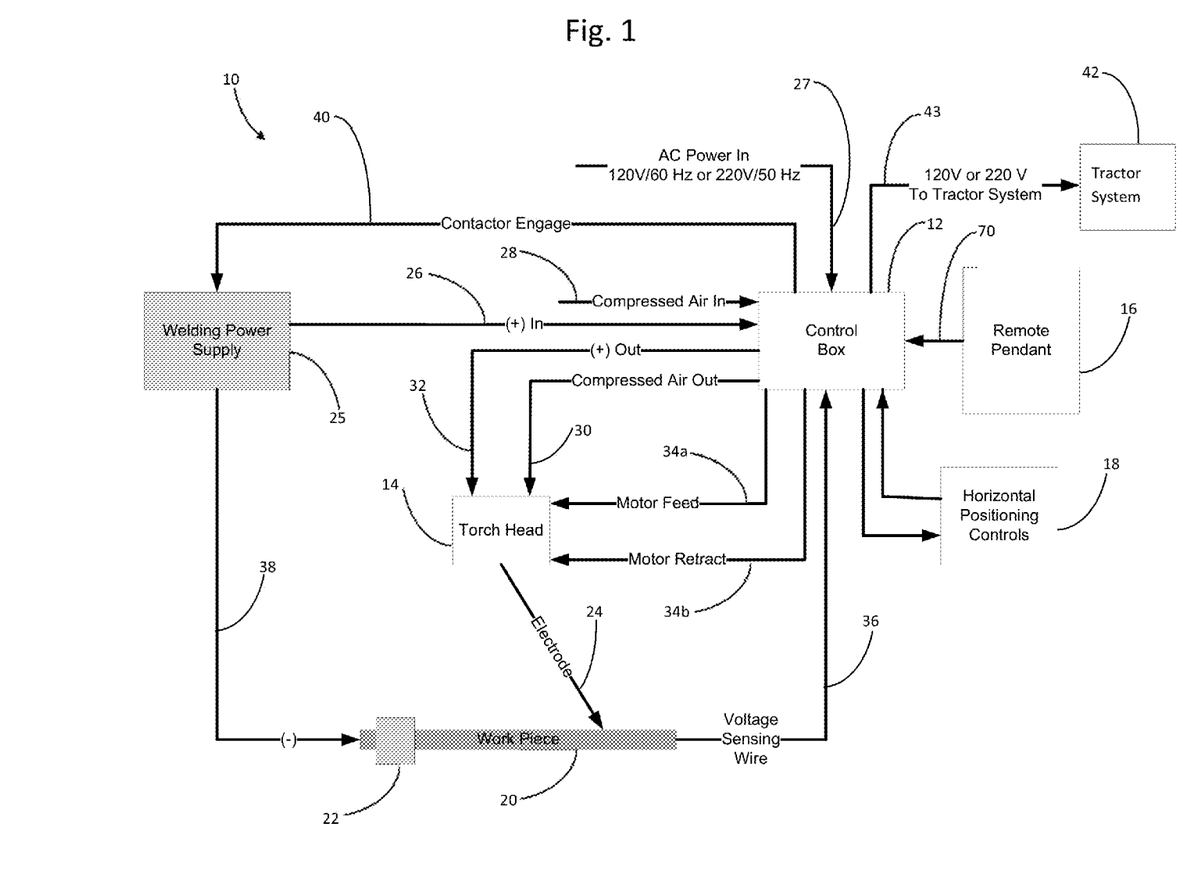
FIG. 1 shows a flow chart depicting an air-carbon arc system 10 embodying the principles of the present invention and having a control box, a torch head, and a remote pendant.

Referring now to the drawings, FIG. 1 shows a flow chart depicting an air-carbon arc system 10 embodying the principles of the present invention and principally including a control box 12 for controlling the system 10, a torch head 14 with an electrode 24 for generating a weld arc, a remote pendant 16 for receiving operational input from the system 10 operator, and horizontal positioning controls 18 for detecting and/or compensating for irregular surfaces on a work piece 20. The work piece 20 is secured within a fixture 22 and is functionally coupled with the system 10. The system 10 may be used for various operations such as gouging, grooving, cutting, or flushing metal from a surface such as the work piece 20.

A welding power supply 25 provides a power source to the torch head 14 via a welding power in 26, the control box 12, and a torch power in 32. In one form, the welding power supply 25 has a current of 1600 Amperes, but may operate at alternative settings. When in operation and in arcing mode, the current from the welding power supply 25 flows through the control box, to the torch head 14, along the electrode 24, and to the work piece 20 via an arc (not shown). The arc heats a localized portion of the work piece 20 and causes the electrode 24 to be consumed and the localized portion of the work piece 20 to become molten metal. The electrode 24 shown in the figures is carbon-based but may be made of alternative material(s). The torch head 14 shown in the figures includes a show assembly that accepts gouging electrodes from 5/16" through 3/4" but a torch head with alternative capacities may be used. Additionally, the electrode 24 shown in the figures is positioned at a 45 degree angle with respect to the work piece 20 surface, but may be used at an alternative position.

The system 10 shown in the drawings is able to produce grooves in the work piece 20. For example, the system 10 may produce U-shaped or J-shaped grooves of various depths up to 1⅛" (28.6 mm) with a single pass and grooves of greater depth with two or more passes. The following chart provides exemplary information that may be used for selecting electrode size and other parameters:

| Electrode Side Diameter | | Gouge Width | | Amperage | |
|---|---|---|---|---|---|
| Inch | mm | Inch | mm | Min | Max |
| 5/16 | 7.9 | 7/16 | 11.1 | 400 | 450 |
| 3/8 | 9.5 | 1/2 | 12.7 | 450 | 600 |
| 1/2 | 12.7 | 13/16 | 20.7 | 800 | 1000 |
| 5/8 | 15.9 | 15/16 | 24.9 | 1000 | 1250 |
| 3/4 | 19.1 | 1 1/16 | 27.0 | 1250 | 1600 |

The system shown in FIG. 1 includes a contactor engage 40 to ensure that the gouging current is only present when the welder/operator presses the "start" button on the remote pendant 16. The contactor engage 40 is movable between a closed position, where current is able to be delivered to the torch head 14, and an open position, where current is not able to be delivered to the torch head 14.

The system shown in FIG. 1 further includes components for delivering compressed air to the torch head 14 for spraying the molten metal away from the work piece 20. Specifically, a compressed air inlet 28 supplies compressed air to the control box 27, which controls the flow of compressed air to the compressed air outlet 30 and to the torch head 14. The system 10 shown in the figures uses between 60 and 100 psi of compressed air but may operate at different settings. By melting and spraying the molten metal away from the localized area of the work piece 20, the arc and compressed air cooperate to effectively remove material from the localized area of the work piece 20, thereby gouging, cutting, scoring, or otherwise modifying the work piece 20. The material may be removed from the work piece 20 in varying amounts and patterns, depending on the movement of the torch head 14 relative to the work piece 20, the operational settings of the torch head 14, the characteristics of the work piece 20 and electrode 24, and other variables. The system 10 may also include a vacuum system for removing the molten metal, such as the system, apparatus, and process disclosed in U.S. Pat. No. 4,797,528 entitled "Vacuum Carbon Air Metal Removal Process and Apparatus," the contents of which are hereby incorporated by reference.

Figure 2:
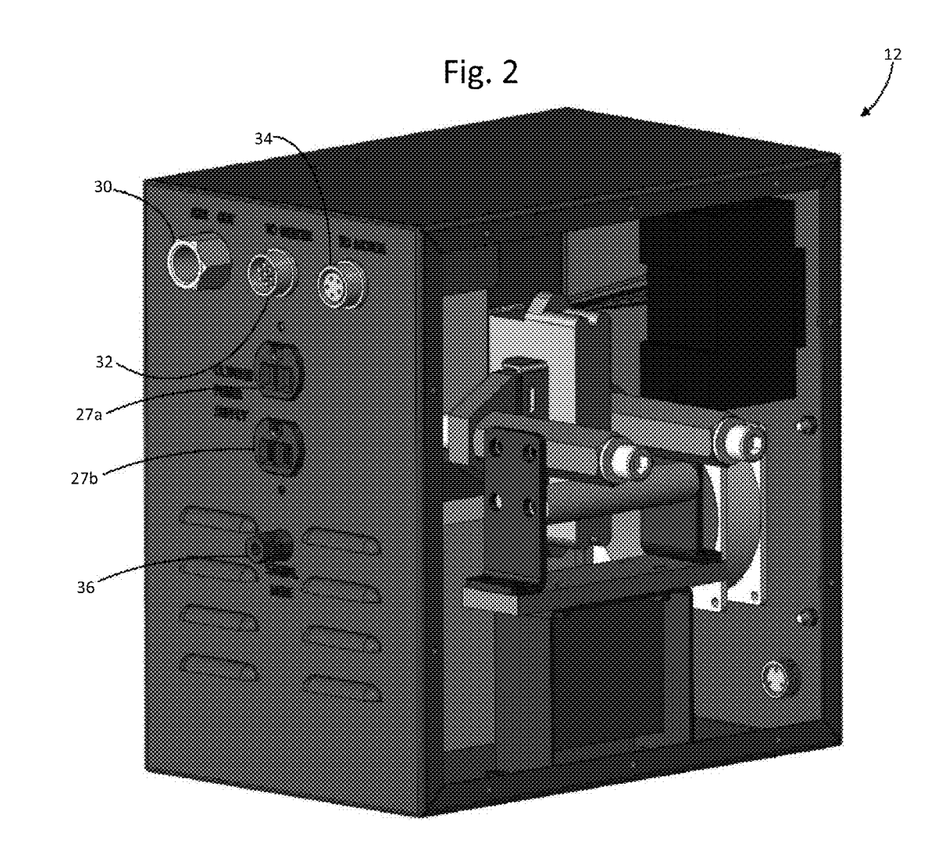
FIG. 2 is an isometric view of a control box, such as the control box depicted in FIG. 1, with one of the side cover panels removed for illustrative purposes.
Figure 3:
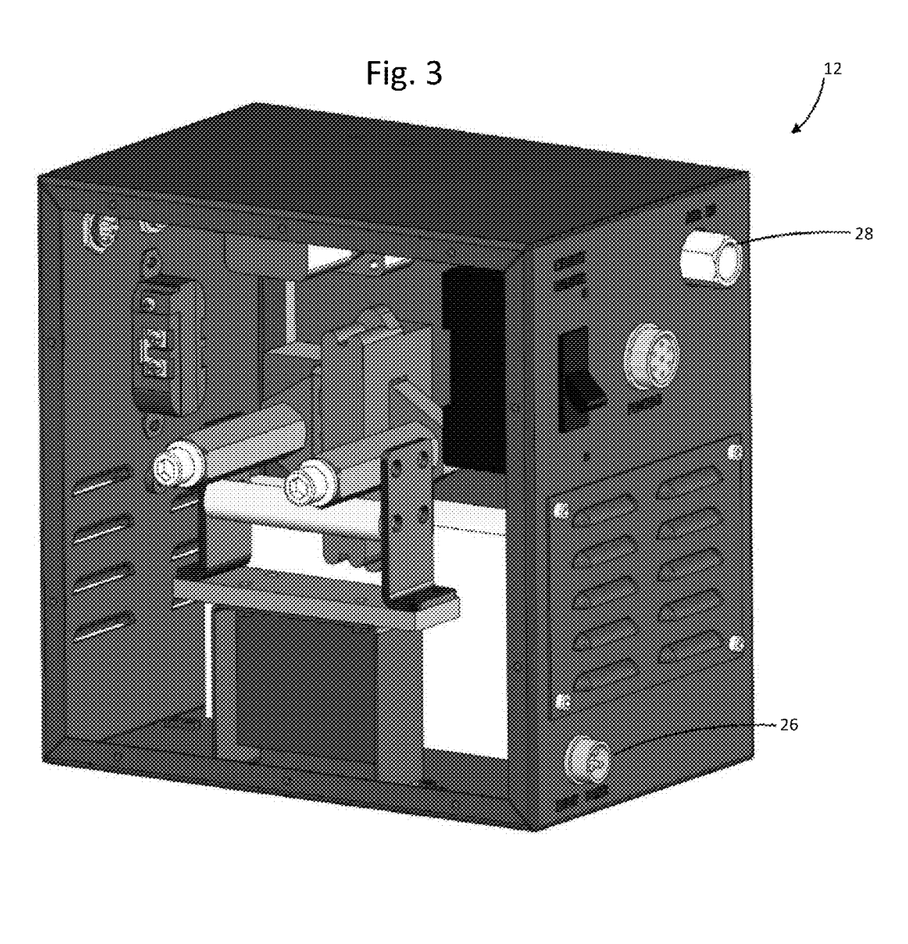
FIG. 3 is a second isometric view of the control box shown in FIG. 2, with the other of the side cover panels removed for illustrative purposes.

An AC power in 27 provides a power source for operating the control box 12, a motor 41 (FIGS. 4, 5) in the torch head 14, and tractor system 42. The AC power in 27 shown in FIG. 1 preferably operates at 120 Volts per 60 Hertz or 220 Volts per 50 Hertz, but may operate at alternative settings. Referring to FIG. 2, the control box 12 includes two plugs 27a and 27b, one for operating at 120 Volts per 60 Hertz and one for operating at 220 Volts per 50 Hertz. The motor 41 is positioned within the torch head 14 and is configured to feed or retract the electrode 24 towards or away from the work piece 20. The motor is controlled by motor feed 34a and a motor retract 34b extending from the control box 12 to the torch head 14. The tractor system 42 is a chassis for causing transverse movement of the torch head 14, such as with a motor and wheel(s). The tractor system 42 may also include a pair of tracks for supporting and facilitating movement of the tractor system 42. A tractor system in 43 provides power to the tractor system 42 and may operate at 120 Volts or 220 Volts.

The motor 41 is controlled by the control box 12 based on input from the voltage sensing wire 36. For example, when the system 10 shown in FIG. 1 is in operation, the voltage sensing wire 36, a voltage ground wire 38, and the contactor engage 40 (when actuated to as to be closed) cooperate to define a closed circuit having a voltage that varies depending on the distance between the electrode 24 and the work piece 20. When the system 10 is operating and in arcing mode, the voltage is proportional to the distance between the electrode 24 and the work piece 20. In other words, when the electrode 24 moves toward the work piece 20 the voltage measured by the voltage sensing wire 36 will decrease. Likewise, when the electrode 24 moves away from the work piece 20 the voltage measured by the voltage sensing wire 36 will increase.

The remote pendant 16 shown in the figures includes mode select buttons 46a, 46b, 46c for shifting and selecting the operation mode of the system 10. The operation mode and other parameters are displayed on a display screen 48. The remote pendant 16 shown in the figures also includes a travel button 52 for adjusting the position of the torch head 14 via the tractor system 42 and jog buttons 54a, 54b for feeding or retracting the electrode 24 relative to the torch head 14. The remote pendant 16 shown in the figures further includes a rotary dial 58 for adjusting the operation mode of the system 10 and/or the operational settings.

Figure 4:
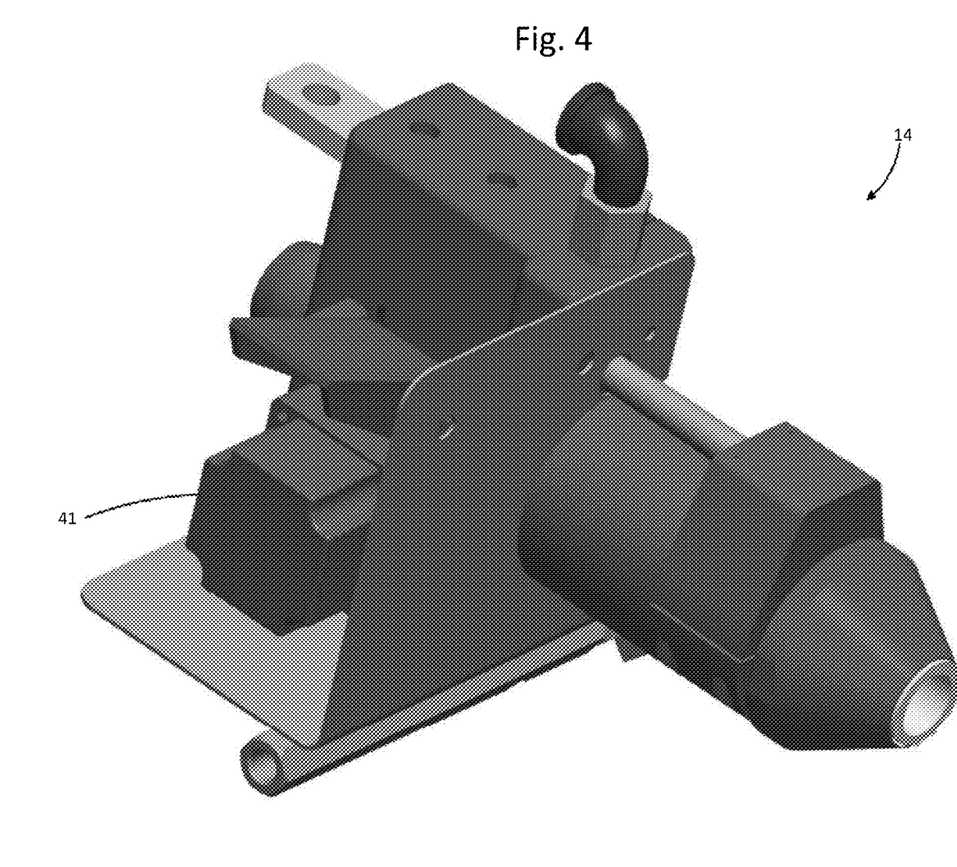
FIG. 4 is an isometric view of a torch head, such as the torch head depicted in FIG. 1.
Figure 5:
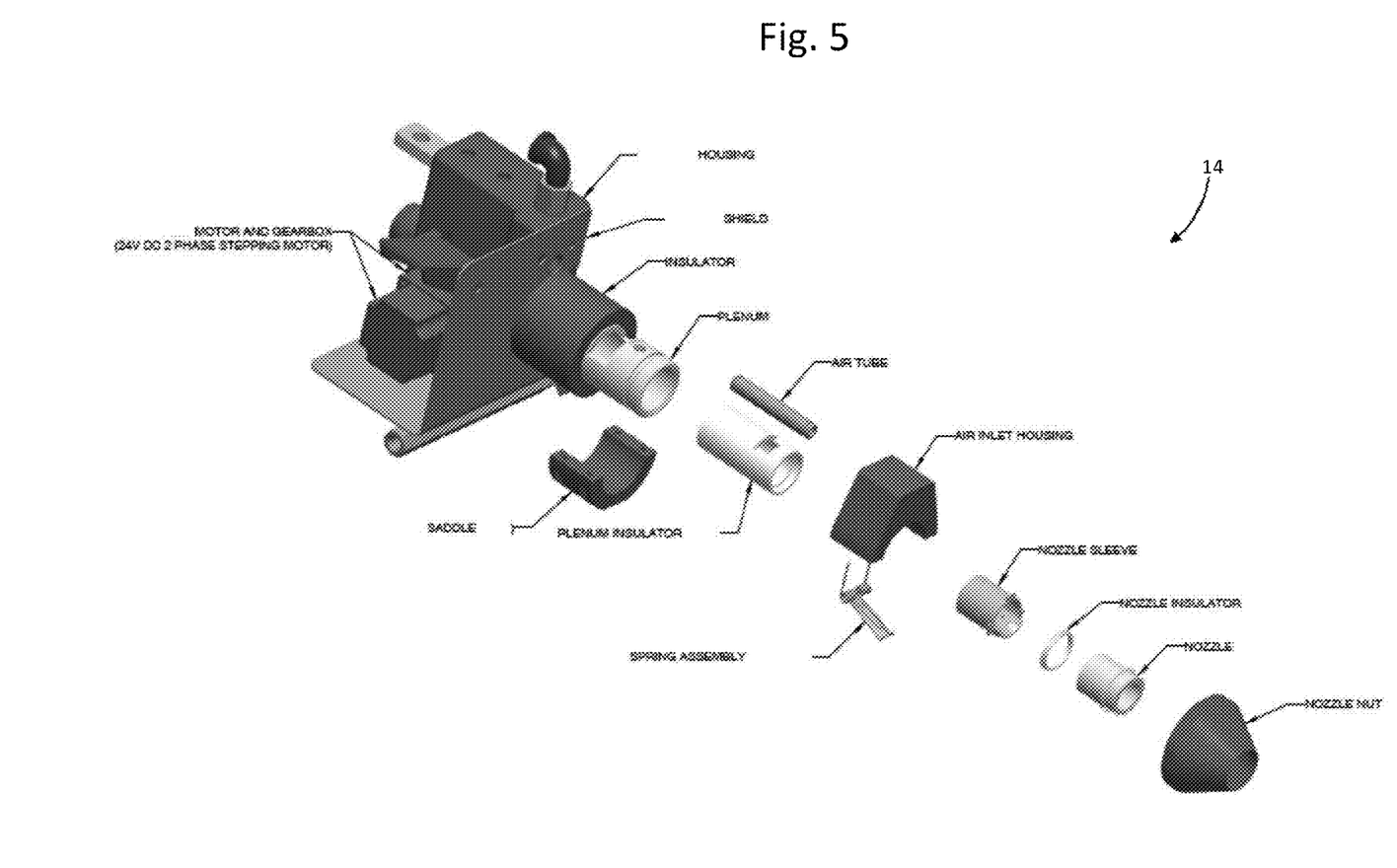
FIG. 5 is an exploded isometric view of the torch head shown in FIG. 4.

During operation, various components of the system 10 may be moving relative to each other along different axes. For example, in the system 10 shown in the figures: the torch head 14 is able to move relative to the work piece 20 via the tractor system 42; the work piece 20 is able to rotate relative to the torch head 14 via the fixture 22; and the electrode 24 is able to move toward or away from the work piece 20 via the motor 41 (FIGS. 4, 5).

Standard Operation Mode

When an operator desires to use the system 10 for gouging a work piece with a smooth, relatively or completely constant surface, he/she may wish to operate the system in standard operation mode. In standard operation mode, the torch head 14 or the fixture 22 is moved at a constant, desired rate of travel and the control box 12 maintains a desired voltage across the work piece 20.

If the work piece 20 is flat, the operator may set the tractor system 42 to a desired rate of travel across the work piece 20. The work piece 20 is secured in place as the tractor system 42 and the torch head 14 move across the work piece 20 in a straight line.

If the work piece 20 is round, the operator may continuously rotate the fixture 22 to create concentric rings around the work piece. In this process, the tractor system 42 and torch head 14 are maintained in a constant position while the fixture 22 and work piece 20 rotate so as to create a concentric ring. After a ring is gouged, the operator may stop the arcing and transversely move the torch head 14 along the axis of the work piece to determine the position of the next ring.

Regardless of whether the work piece 20 is round or flat, when the system 10 is operated in standard operation mode the operator sets the control box 12 to a desired voltage and the motor 41 is automatically actuated to move the electrode 24 toward or away from the work piece 20 so as to maintain the operator-specified voltage in the voltage sensing wire 36. For example, by using the tune knob 58 the system 10 operator inputs into the control box 12 a target voltage and a desired voltage range. As a further example, the system operator may choose to operate the system 10 in FIG. 1 at a desired voltage of 40 Volts with a range of +/−0.5 Volts. When the system 10 is configured to maintain the operator-specified voltage, the arc intensity and amount of material removed from the work piece 20 remain constant or substantially constant across flat or constant portions of the work piece 20.

After selecting the desired settings, such as traverse speed of the tractor system 42 or rotation speed of the fixture 22 and desired voltage across the work piece 20, the operator may depress the start button 50 and cause a current to travel from the welding power supply 25 to the electrode 24 such that an arc forms between the electrode and the work piece 20. If the operator depresses the stop button 56, current will no longer flow from the welding power supply 25 to the electrode 24 and the arc between the electrode 24 and the work piece 20 will cease.

Because the voltage of the arc, and thus the rate at which material is removed from the work piece 20, depends on the distance between the distal tip of the electrode 24 and the work piece 20, the standard operating mode is effective for creating a relatively flat, flush, smooth, and/or otherwise constant surface if the work piece 20 was flat, flush, smooth, and/or otherwise constant surface before the operator began using the system 10. However, an operator using the standard operating mode may have difficulties reducing irregularities in the surface of the work piece 20. More specifically, because the control box maintains a constant distance between the work piece 20 and the electrode 24 during the standard operating mode, the electrode 24 will tend to trace and possibly exaggerate surface irregularities rather than reduce them.

Figure 8:
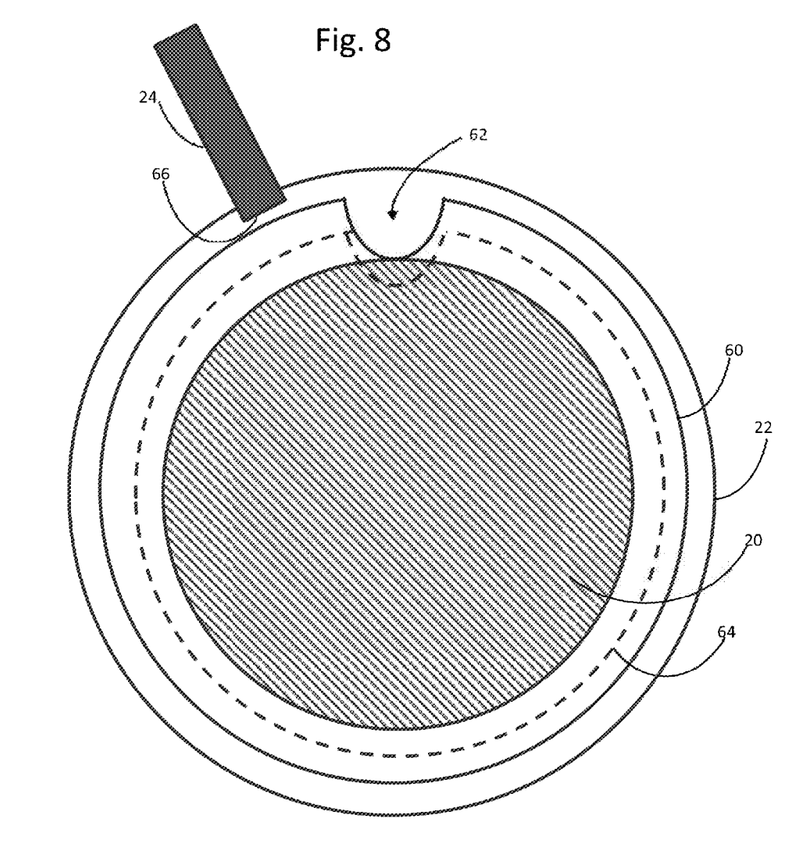
FIG. 8 is a cross-sectional view of a work piece positioned in a fixture and an electrode from a torch head such as the torch head shown in FIGS. 5 and 6.

FIG. 8 is cross-sectional view of the work piece 20 positioned in the fixture 22 and an electrode 24. The work piece 20 includes a hardfaced portion having a generally constant thickness around the circumference of the work piece 20, except for a depression 62 where the hardfacing has been chipped or worn away. If the system 10 operates in the standard operating mode on the work piece 20 shown in FIG. 8, it will remove hardfacing to a particular depth based on the operator's inputs. For example, the system 10 may have a desired voltage setting so as to remove hardfacing to a depth as indicated by dotted line 64.

Because the system operating in the standard operating mode will generally maintain a constant distance between the distal end 66 of the electrode 24 and the portion of the work piece 20 to be machined, the dotted line 64 will remain relatively smooth and constant around the constant-diameter portions of the work piece 20. However, when the electrode 24 approaches the depression 62, it will trace the depression 62 by moving downward into the depression 62 and removing material therefrom. As a result, the post-machining depression may be deeper and larger than the original depression 62.

Manual Correction Mode

Figure 6:
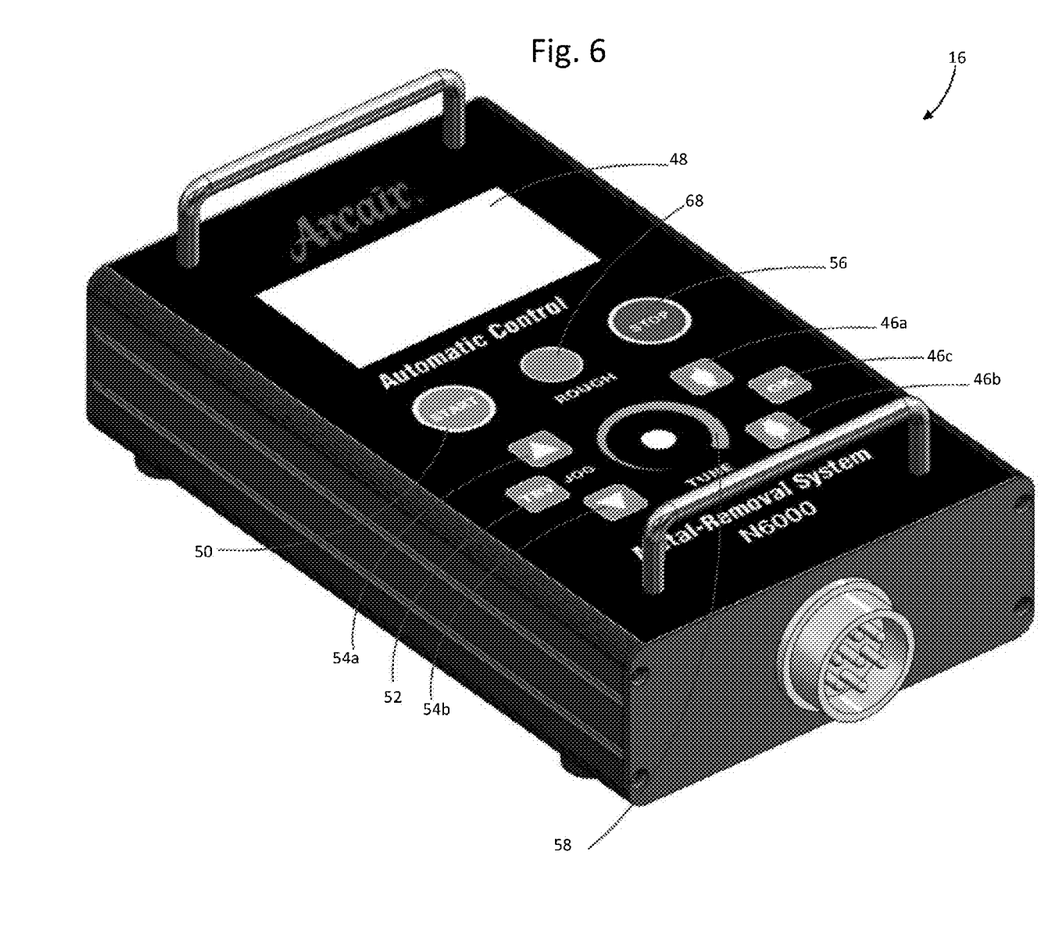
FIG. 6 is an isometric view of a remote pendant, such as the remote pendant depicted in FIG. 1.
Figure 7:
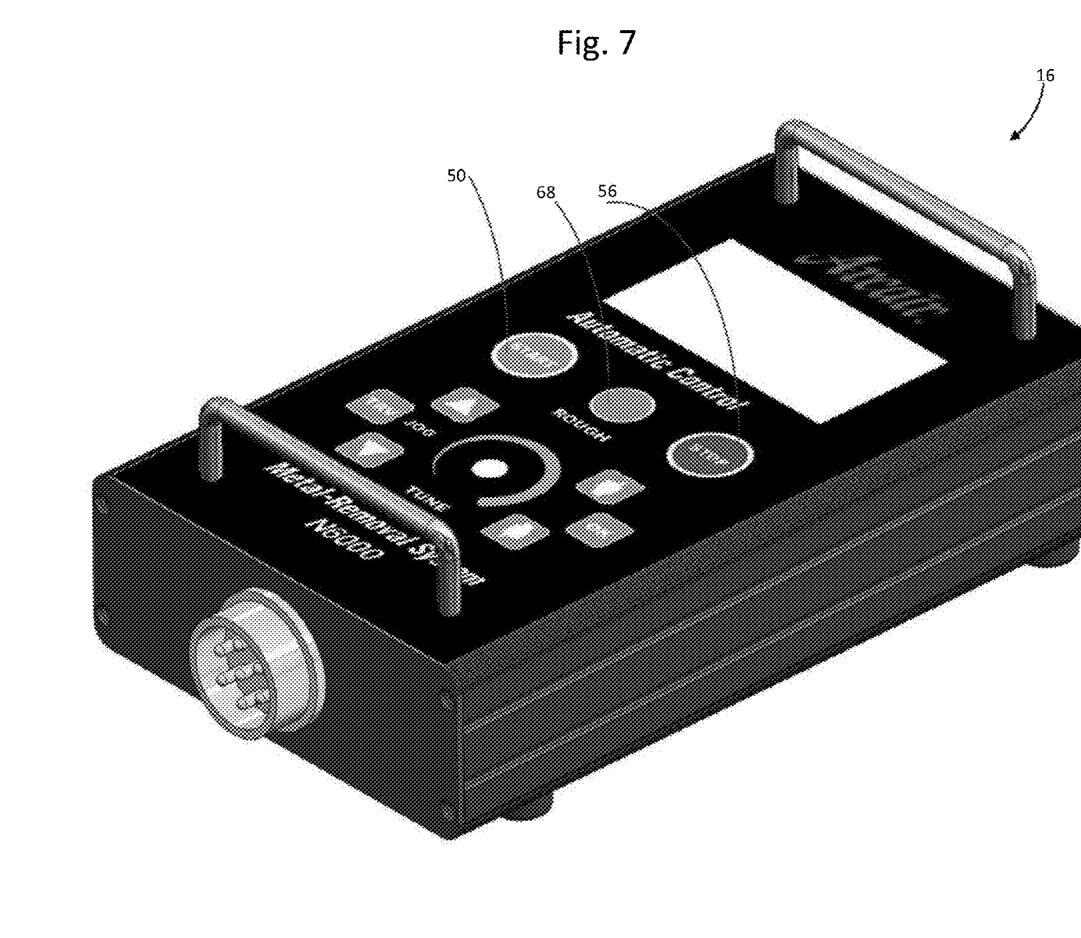
FIG. 7 is a second isometric view of the remote pendant shown in FIG. 6.

Another such operating mode, the manual correction mode, operates the same as the standard operating mode, but allows the system 10 operator to override the motor 41 to minimize or eliminate surface irregularities in the surface of the work piece 20. For example, as shown in FIGS. 6 and 7, the remote pendant 16 includes a rough button 68 for stalling the motor and preventing the electrode 24 from moving toward the work piece 20 while the rough button 68 is being depressed. When the motor 41 is stalled, the electrode 24 no longer moves forward as the electrode 24 is consumed, and as a result the torch head 14 ceases to arc. During this time, the voltage across the work piece 20 drops to zero.

For example, when the system operator depresses the rough button 68, the remote pendant 16 sends an electrical signal to the control box 12 via signal 70, which may be a wireless or a wired signal. The control box 12, in turn, disables motor 41 to prevent the electrode 24 from moving toward or away from the work piece 20 for as long as the rough button 68 is depressed. Once the electrode 24 clears the depression 62 or other surface irregularities, the operator will preferably release the rough button 68 and the motor 41 will reengage and resume the gouging process at a constant or substantially constant depth.

Turning again to FIG. 8, the system operator would optimally depress the rough button 68 just before the electrode 24 reached the leading edge 72 of the depression 62, thereby preventing the electrode 24 from moving into the depression 62 and tracing the surface irregularity. Then, the system operator would optimally release the rough button 68 just before the electrode 24 reached the trailing edge 74 of the depression 62, thereby resuming the gouging process.

When operating the system 10 in manual correction mode, the operator preferably maintains visual contact with the work piece 20, either by viewing the work piece 20 through appropriate protective glasses or translucent or transparent shield, or through the aid of a video display at a safe distance from the operating system. In either case, it is imperative that the operator maintain a safe distance from the system and follow all other appropriate safety protocol for welding and/or gouging processes.

Automatic Correction Mode

Yet another such operating mode, automatic correction mode, operates the same as the manual correction mode, but allows the system 10 automatically stall the motor 41 when the electrode 24 approaches a surface irregularity on the work piece 20. The horizontal positioning controls 18 depicted in FIG. 1 preferably include a contact and/or non-contact sensor or other device for detecting surface irregularities. When the horizontal positioning controls 18 detect an irregularity, the control box 12 automatically stalls the motor 41 when the electrode 24 reaches the leading edge of the surface irregularity and resumes the gouging process when the electrode 24 reaches the trailing edge of the surface irregularity. As with the manual correction mode, when the motor 41 is stalled, the electrode 24 no longer moves forward as the electrode 24 is consumed, and as a result the torch head 14 ceases to arc.

In the case of a contact sensor, the horizontal positioning controls 18 may include a stylus or other physical device, preferably positioned in front of the electrode when measured along the direction of travel for the torch head 14. The stylus or other physical device may be spring loaded or otherwise free to move in a direction normal to the surface of the work piece so as to track the surface thereof. Additionally, the stylus or other physical device may be positioned a minimum clearance distance in front of the electrode when measured along the direction of travel for the torch head 14 so as to reduce the likelihood that the stylus or other physical device is damaged by molten metal. In this case, the distance between the electrode 24 and the stylus or other physical device is preferably relatively constant and said distance is inputted into the control box 12 so the control box 12 is able to determine the position of the electrode based on the position of the stylus or other physical device. Additionally, if the system 10 includes a vacuum system for removing the molten metal, such as the system, apparatus, and process disclosed in U.S. Pat. No. 4,797,528 entitled "Vacuum Carbon Air Metal Removal Process and Apparatus," then it may reduce the likelihood that the contact sensor is damaged or destroyed by molten metal and/or improve the performance of the contact sensor.

In the case of a non-contact sensor, the horizontal positioning controls 18 may include a laser, optical device, or other non-contact sensor for detecting irregularities on the surface of the work piece 20. The non-contact sensor is preferably aimed at a position in front of the electrode when measured along the direction of travel for the torch head 14. Additionally, the physical component of the non-contact sensor may be positioned a minimum clearance distance from the distal end of the electrode so as to reduce the likelihood that the stylus or other physical device is damaged by molten metal. As described above with the contact sensor, a vacuum system may improve the performance and/or part life of the non-contact sensor.

By maintaining the arc voltage or amperage and a constant travel speed, the groove formed by the system 10 in the work piece 20 may be very precise, such as within 0.025" (0.635 mm) target depth.

The system may be used with electrodes 24 that are to mate with each other so as to provide an uninterrupted feed of electrodes 24. For example, the system 10 may be used with Arcair® Jointed Jetrod Electrodes with tapered male and female ends for producing grooves of unlimited length.

Information such as electrode size, desired depth, DC current, travel speed, and other system parameters may be stored in a microprocessor in the remote pendant 16 or the control box 12 and may be displayed to the system operator via the display screen 48 on the remote pendant 16. The following chart provides exemplary information that may be used for selecting electrode size, desired depth, DC current, and travel speed:

| Electrode Diameter | | Desired Depth | | DC Current | Travel Speed per Minute | |
|---|---|---|---|---|---|---|
| Inch | mm | Inch | mm | Amps | Inch | mm |
| 5/16 | 7.9 | 1/8 | 3.2 | 400 | 65 | 1651 |
| 5/16 | 7.9 | 3/16 | 4.8 | 400 | 45 | 1143 |
| 5/16 | 7.9 | 1/4 | 6.4 | 450 | 36 | 914 |
| 5/16 | 7.9 | 5/16 | 7.9 | 450 | 33 | 838 |
| 5/16 | 7.9 | 7/16 | 11.1 | 500 | 22.5 | 572 |
| 3/8 | 9.5 | 1/8 | 3.2 | 500 | 70 | 1778 |
| 3/8 | 9.5 | 3/16 | 4.8 | 500 | 44 | 1118 |
| 3/8 | 9.5 | 1/4 | 6.4 | 500 | 35 | 889 |
| 3/8 | 9.5 | 3/8 | 9.5 | 500 | 20 | 508 |
| 3/8 | 9.5 | 9/16 | 14.3 | 500 | 17.5 | 445 |
| 1/2 | 12.7 | 1/8 | 3.2 | 850 | 96 | 2438 |
| 1/2 | 12.7 | 1/4 | 6.4 | 850 | 57 | 1448 |
| 1/2 | 12.7 | 3/8 | 9.5 | 850 | 35 | 889 |
| 1/2 | 12.7 | 1/2 | 12.7 | 850 | 24 | 610 |
| 1/2 | 12.7 | 3/4 | 19.1 | 850 | 17.5 | 445 |
| 5/8 | 15.9 | 1/4 | 6.4 | 1250 | 72 | 1829 |
| 5/8 | 15.9 | 3/8 | 9.5 | 850 | 48 | 1219 |
| 5/8 | 15.9 | 1/2 | 12.7 | 850 | 37 | 940 |
| 5/8 | 15.9 | 5/8 | 15.9 | 850 | 30 | 762 |
| 5/8 | 15.9 | 15/16 | 23.8 | 850 | 19.5 | 495 |
| 3/4 | 19.1 | 1/4 | 6.4 | 1400 | 72 | 1829 |
| 3/4 | 19.1 | 3/8 | 9.5 | 1400 | 42 | 1068 |
| 3/4 | 19.1 | 1/2 | 12.7 | 1400 | 34 | 865 |
| 3/4 | 19.1 | 5/8 | 15.9 | 1400 | 27 | 687 |
| 3/4 | 19.1 | 3/4 | 19.1 | 1400 | 22 | 560 |
| 3/4 | 19.1 | 1 1/8 | 28.6 | 1400 | 13 | 330 |

The microprocessor in the remote pendant 16 and/or the control box 12 may also record system diagnostics data such as gouging run time, operation parameters, low voltage shutdown events, and other information that may be helpful for diagnosing and fixing issues. A low voltage shutdown event occurs when the voltage supplied to the system 10 drops below 28 volts so as to minimize or reduce potential damage to the system.

In one alternative embodiment, the pendant is operatively connected to the control box 12 via a wireless connection. In another alternative embodiment, the pendant is mounted to the control box 12 or the pendant controls are integral to the control box 12.

In another alternative embodiment, the system is operated by maintaining a constant current across the work piece rather than maintaining a constant voltage as discussed above.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

The invention claimed is:

1. An air-carbon arc system comprising:
   a control box;
   a torch head operationally connected to the control box and configured to cooperate with an electrode and the work piece to generate an arc;
   a motor for advancing and retracting the electrode relative to the work piece; and
   a pendant operationally connected to the control box for stopping arc gouging by stalling the motor to prevent the motor from advancing or retracting the electrode relative to the work piece.

2. An air-carbon arc system as in claim 1 wherein the pendant operationally connected to the control box includes an operator input for stalling the motor and preventing the motor from advancing or retracting the electrode towards or away from the work piece.

3. An air-carbon arc system as in claim 1 wherein the pendant operationally connected to the control box includes an automatic operation for stalling the motor and preventing the motor from advancing or retracting the electrode towards or away from the work piece.

4. An air-carbon arc system as in claim 3 wherein the system further includes a contact sensor for detecting irregularities in the work piece surface.

5. An air-carbon arc system as in claim 4 wherein the contact sensor includes a stylus.

6. An air-carbon arc system as in claim 3 wherein the system further includes a non-contact sensor for detecting irregularities in the work piece surface.

7. An air-carbon arc system as in claim 6 wherein the non-contact sensor includes a laser.

8. An air-carbon arc system as in claim 1, wherein the pendant includes a microprocessor for storing system parameter information.

9. An air-carbon arc system as in claim 8, wherein the pendant includes a display screen for displaying the system parameter information.

10. An air-carbon arc system as in claim 8, wherein the microprocessor is configured to store system operational information.

11. An air-carbon arc system as in claim 10, wherein the pendant includes a display screen for displaying the system operational information.

12. An air-carbon arc apparatus comprising:
    a control box;
    a torch head operationally connected to the control box and configured to cooperate with an electrode and the work piece to generate an arc;
    a motor for advancing and retracting the electrode relative to the work piece; and
    a pendant operationally connected to the control box for stalling the motor to stop arc gouging.

13. A method for arc gouging a work piece surface comprising:
    operating an air-carbon arc system to remove material from the work piece surface, wherein the air-carbon arc system includes a control box, a torch head having an electrode and operationally connected to the control box and configured to cooperate with the work piece to generate an arc, and a pendant operationally connected to the control box;
    measuring a voltage across the work piece;
    controlling the position of the electrode with respect to the work piece surface so as to maintain as substantially constant the voltage across the work piece; and
    discontinuing the step of controlling the position of the electrode when a irregularity in the work piece surface is detected.

* * * * *